Jan. 28, 1964  H. K. ORBACH  3,119,758
METHOD AND APPARATUS FOR PRODUCING ACETYLENE
Filed Jan. 30, 1962
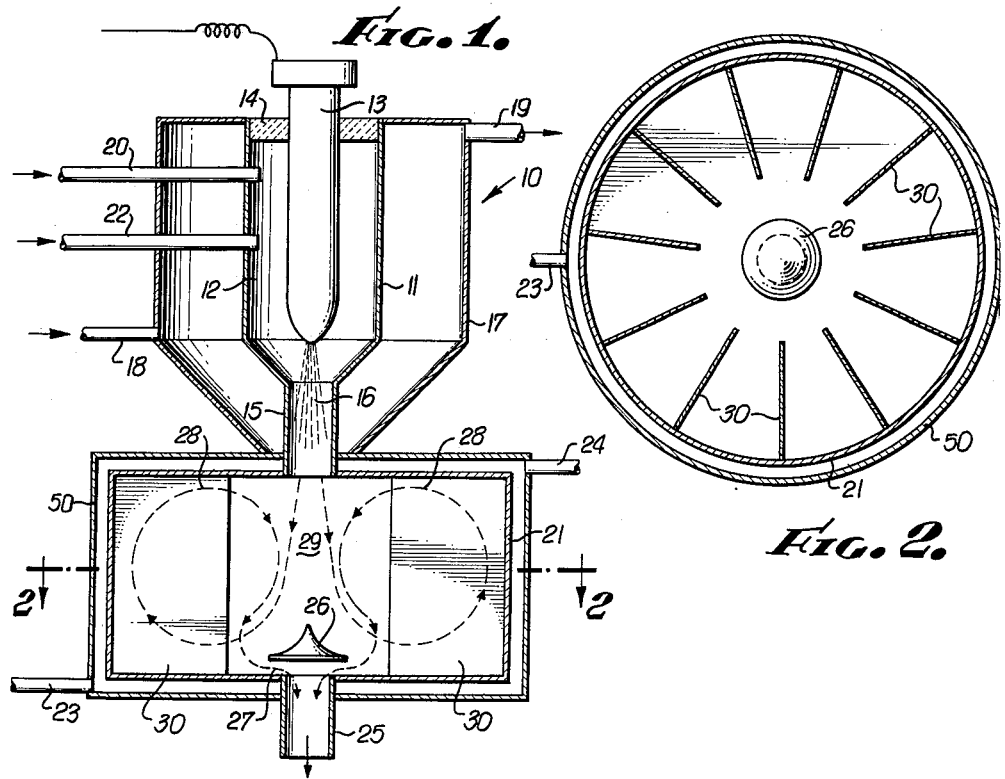
FIG. 1.
FIG. 2.
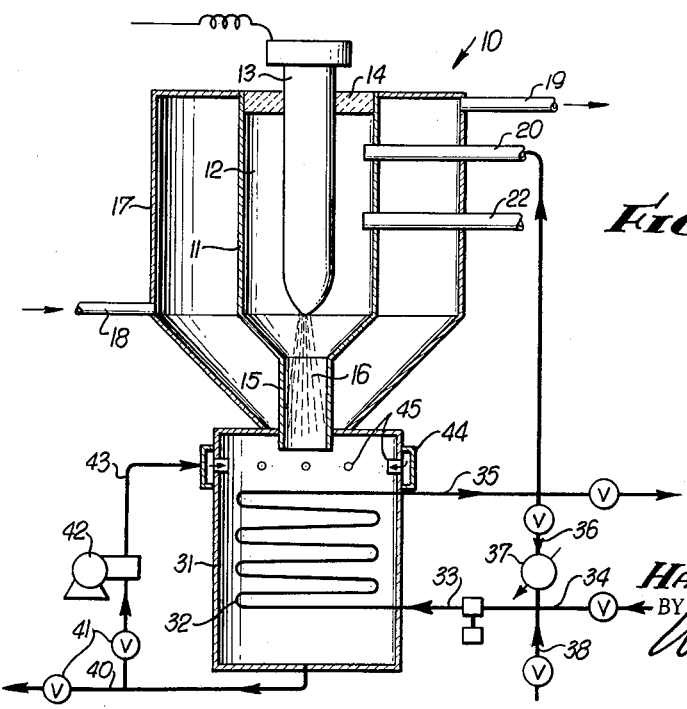
FIG. 3.
INVENTOR.
HARRY K. ORBACH
BY
ATTORNEYS.

United States Patent Office 3,119,758
Patented Jan. 28, 1964

3,119,758
METHOD AND APPARATUS FOR PRODUCING ACETYLENE
Harry K. Orbach, Corona del Mar, Calif., assignor to MHD Research, Inc., Newport Beach, Calif., a corporation of California
Filed Jan. 30, 1962, Ser. No. 169,900
17 Claims. (Cl. 204—171)

This invention has to do generally with improved methods and apparatus for the production of acetylene by high temperature conversion of selected feed in an electric arc created in so-called plasma-jet type of equipment.

Employing the plasma technique, appropriate feed material or materials are fed into the high temperature atmosphere of an electric arc under conditions causing formation of acetylene in the plasma or gaseous effluent from the arc zone. Because of the high temperature range of the effluent, problems arise in achieving maximum acetylene yield due to the dissociation tendencies of formed acetylene, and also in using desirably ordinary materials for the equipment chamber which receives the hot arc effluent.

My primary object is to solve such problems by subjecting the hot acetylene-containing jet stream to quenching in a manner that will serve for rapid cooling without undesirably affecting the stream. Specifically, the invention contemplates efficient quenching of the hot gas stream without introduction of foreign materials or dilution of the stream, by using a cooled and recirculated portion of the stream itself.

The exclusion of oxygen-containing materials is particularly important for several reasons. First, they tend to form peroxy acids with higher acetylene homologues which in turn tend to cause polymerization of the acetylene, causing loss of product, plugging of the equipment and are dangerously reactive with air. Secondly, use of materials such as water for the quench tends to lower the efficiency of commonly-used purification solvents such as dimethyl formamide. Thirdly, any carbon dioxide formed in the quench operation constitutes an undesirable contaminant which is difficult to remove. The use of inert or hydrocarbon materials to quench the reaction products tends to dilute the acetylene—adversely affecting the economics of the process by requiring a larger and perhaps more complicated purification system.

As will appear in greater detail, the invention contemplates cooling the effluent from the arc in two steps; first, by positively directing a portion of the cooled product gases into said effluent to bring the resulting mixture below the decomposition temperature for acetylene and to allow further cooling of the mixture in the second step to be carried out in conventional indirect heat exchange equipment capable of remaining in continuous service for long periods of operation. The second cooling step provides both cool gases for the first step and a means for recovering heat from the arc effluent by using cold process feed materials as said coolant.

Structurally, the invention contemplates direct connection with the arc discharge passage, of a chamber with which is associated means for positively directing a cooled recirculated portion of the gaseous effluent into the hot stream emanating from the arc, all in a manner which provides for rapidly quenching of the stream quickly following its arrival at peak temperature. Cooling of the gas for quenching recirculation may be effected in the initial receiving chamber by directed recirculation within the chamber, or a cooled and divided portion of the chamber effluent may be recirculated for the quenching.

All the features and objects of the invention, as well as the details of illustrative embodiments, will be given further explanation in the following description of the diagrammatic showings of the accompanying drawing, in which:

FIG. 1 is a sectional view showing one embodiment of the invention which operates to quench the plasma stream by effluent recirculation within a chamber receiving said stream;

FIG. 2 is a cross-section on line 2—2 of FIG. 1; and

FIG. 3 is a view similar to FIG. 1 showing a variational embodiment of the invention, according to which quenching is accomplished by recirculating cooled gas split from the effluent taken from the receiving chamber.

Referring to the drawing, the structure generally indicated at 10 may be regarded as illustrative of any suitable plasma jet type of equipment capable of causing conversion to acetylene of appropriate feed material or materials, in a high temperature electric arc. Accordingly, the equipment shown at 10 is to be regarded as being merely illustrative of any of various known specific forms of plasma jet apparatus usable for acetylene production, including those where a plasma is formed in part of the feed stream and subsequently mixed with the remainder of the feed.

According to the simplified form shown, the plasma jet apparatus comprises a tubular wall 11 defining an annular passage 12 about a concentric electrode 13 insulated at 14 from the passage wall. Passage 12 discharges through a reduced outlet 15 into which may be projected at 16 the arc from the tip of the electrode 13. These passages may be cooled as by enclosure within a jacket 17 to which an appropriate coolant, such as water, is introduced at 18 to leave through outlet 19. The high temperature electric arc may function to cause the formation of acetylene from any of various appropriate feeds known to those familiar with the art. As illustrative, the feed may comprise hydrogen introduced to passage 12 through line 20, and one or more hydrocarbons within the $C_1$ to $C_4$ range, or heavier, fed to the passage through line 22. The intimately admixed feed streams react in the high temperature atmosphere of the arc, to produce acetylene which typically may constitute around 5 to 20 percent of the effluent from passage 15.

This effluent ordinarily will have a temperature of around 900 to 1500° C., within which temperature range the initially formed acetylene may be unstable or tend to dissociate if allowed to remain at that temperature over any substantial period of time. My object, therefore, is to effect such quick quenching or temperature reduction of the effluent from the arc so as to arrest acetylene dissociation and therefore maintain maximum acetylene in the product gas.

According to the showing of FIG. 1, the effluent from passage 15 is discharged into an enlarged chamber 21, the walls of which are cooled by enclosure within a jacket 50 through which is circulated an appropriate coolant, such as water, introduced to the jacket through line 23 and discharged through the outlet 24. With the chamber so jacketed, gases sweeping the chamber walls are effectively cooled by indirect heat exchange with the jacket water. Provision is made for both cooling and positively recirculating the gas within chamber 21, and for bringing the cooled, recirculating gases into intimate and quenching contact with the effluent leaving passage 15. Chamber 21 has an outlet 25 above which is positioned a baffle 26 so shaped, proportioned and spaced at 27 from the outlet as to deflect and cause recirculation as in the paths of the arrowed lines 28 of sufficiently large proportion of the gas to serve its quenching purposes. Alternate means of causing the internal recirculation such as the appropriate length to diameter to surface area ratio of chamber 21 may be used. FIGURE 1 is only illustrative of one means. The recirculated gas is positively directed into both cooling contact with the wall of the chamber and into the hot effluent from passage 15, by providing within the chamber an assembly of radial, circularly spaced baffles 30. Those portions of the gas received between the baffles are directed by the latter into intimate sweeping contact with the chamber wall, and are further directed inwardly to admix at 29 with the hot gas discharge from passage 15 so as to quickly quench the stream to a reduced temperature, say in the order of 300 to 600° C., at which temperature the formed acetylene will be stabilized, particularly in the presence of hydrogen from the arc reaction. As will be understood, the product gas stream taken from the outlet 25 may be fractionated or processed in any suitable manner for the concentration or recovery of its acetylene content.

FIG. 3 illustrates a variational embodiment of the invention employing, as before, the conventionally illustrated plasma jet unit 10, wherein parts corresponding to the apparatus in FIG. 1 are given corresponding reference numerals. Here passage 15 is shown to discharge into an enlarged chamber 31 wherein the gas is first partially cooled by injection of cool product gases injected through line 43 and nozzles 45 to about 300–600° C., and then further cooled to substantially ambient temperature as by means of an exchanger coil 32 fed with liquid or gas coolant through line 33. A liquid coolant such as water, supplied or made up through line 34 may be recirculated from the outlet 35 through line 36 and cooler 37. Alternatively, I may use as all or part of the coolant a feed gas component or all feed components fed to the coil 32, or to a series of such coils through lines 38 and 33, the gas leaving through outlet 35 being fed to passage 12 through line 20.

The product gas stream leaving chamber 31 through line 40 is split by proper control of valves 41 and a recirculated portion discharged by compressor 42 through line 43 into manifold 44, from which the gas is jetted through openings or nozzles 45 into the hot gas effluent from passage 15 to quickly quench the latter as and for the purposes explained. The other portion is sent to the purification step for product recovery.

I claim:

1. The method that includes discharging a hot gaseous stream from the atmosphere of an electric arc wherein acetylene is formed in the stream, and quickly quenching said stream by cooling, recirculating and positively directing a portion of the gas into the hot effluent from the arc atmosphere.

2. The method of claim 1, in which said stream is so quenched from a temperature between about 900° C. and 1500° C. to about 300° C. and 600° C.

3. The method of claim 1, in which the recirculated gas is cooled by heat exchange with liquid coolant.

4. The method of claim 1, in which the recirculated gas is cooled by heat exchange with a gaseous stream being fed to the arc atmosphere.

5. The method of claim 1, in which staid stream is discharged from the arc atmosphere into an enlarged zone and a portion of the stream is positively directed in a recirculating path into the hot stream proximate said zone.

6. The method of claim 5, in which cooling liquid is passed in heat exchange relation with the gas in said zone.

7. The method of claim 1, in which said stream is discharged from the arc atmosphere directly into a quenching zone, from which the gas is withdrawn and a cooled portion thereof is recirculated into the hot stream leaving the arc atmosphere.

8. The method of claim 7, in which the gas stream is cooled by heat exchange with liquid coolant.

9. The method of claim 7, in which the gas stream is cooled by heat exchange with a gas stream being fed to the arc atmosphere.

10. Apparatus comprising means forming a relatively reduced reaction passage, an electrode in said passage adapted to discharge a high temperature arc for conversion of gas fed to said passage, a relatively enlarged chamber receiving the hot gaseous effluent from the passage outlet, means for cooling said effluent, and means for recirculating and positively directing a portion of the cooled effluent into the hot gas stream leaving said passage.

11. Apparatus according to claim 10, in which said cooling means comprises means for passing liquid coolant in indirect heat exchange relation with said effluent.

12. Apparatus according to claim 10, in which said cooling means comprises means for passing a gaseous stream in indirect heat exchange relation with said effluent and thence into said passage and the arc atmosphere.

13. Apparatus according to claim 10, comprising means for effecting said cooling by passing a fluid coolant in indirect heat exchange relation with the gas in said chamber, and baffle means in the chamber for causing recirculation and positive direction of a portion of the chamber gases into the hot gas stream.

14. Apparatus according to claim 13, in which said chamber has an outlet, and means for baffling the gas escape through said outlet.

15. Apparatus according to claim 14, in which said baffle means comprises a circular series of radial baffles in the chamber, and in which a cooling liquid jacket surrounds the chamber.

16. Apparatus according to claim 10, in which the gaseous effluent is withdrawn from said chamber, and a portion of the withdrawn gas is recirculated into the hot stream discharging from said passage outlet.

17. Apparatus according to claim 16, comprising means for effecting said cooling of the gas in said chamber.

References Cited in the file of this patent

UNITED STATES PATENTS

| 1,904,426 | Eisenhut | Apr. 18, 1933 |
| 2,837,654 | Berghans et al. | June 3, 1958 |